United States Patent [19]

Belau et al.

[11] Patent Number: 5,725,242
[45] Date of Patent: *Mar. 10, 1998

[54] AIRBAG SQUIB WITH SILICON CIRCUIT AND ENERGY STORAGE

[75] Inventors: Horst Belau, Clarkston; Charles R. Cook, Jr., Rochester Hills, both of Mich.; Marten Swart, Obertroeugling, Germany; Mark A. Parsons, Rochester, Mich.

[73] Assignees: Siemens Automotive Corporation, Auburn Hills; Ford Motor Company, Dearborn, both of Mich.

[ * ] Notice: The term of this patent shall not extend beyond the expiration date of Pat. No. 5,722,687.

[21] Appl. No.: 599,613

[22] Filed: Feb. 9, 1996

[51] Int. Cl.⁶ .................... B60R 21/26; B60R 21/32
[52] U.S. Cl. ............... 280/735; 280/741; 102/202.5; 307/10.1
[58] Field of Search ............... 280/735, 734, 280/736, 741, 728.1; 102/202.5; 340/436, 438; 307/10.1

[56] References Cited

U.S. PATENT DOCUMENTS

| | | | |
|---|---|---|---|
| 4,819,560 | 4/1989 | Patz et al. | 102/202.5 |
| 4,843,964 | 7/1989 | Bickes, Jr. et al. | 102/202.5 |
| 5,122,954 | 6/1992 | Okano | 280/735 |
| 5,400,867 | 3/1995 | Muller et al. | 280/735 |
| 5,577,768 | 11/1996 | Taguchi et al. | 280/735 |

FOREIGN PATENT DOCUMENTS

| | | | |
|---|---|---|---|
| 4-201762 | 7/1992 | Japan | 280/735 |
| 4-342638 | 11/1992 | Japan | 280/735 |

*Primary Examiner*—Peter C. English
*Attorney, Agent, or Firm*—Russel C. Wells

[57] ABSTRACT

A control arrangement for a deployable airbag of a vehicle is provided with first and second airbag controllers for receiving a fault signal at the first airbag controller, and for producing at the second airbag controller a deployment command signal that indicates that the deployable airbag is to be deployed. The second airbag controller receives the deployment command signal, and is provided with a communication controller for receiving the deployment command signal, a squib for firing in response to the deployment command signal whereby the deployable airbag is deployed, and an energy transfer arrangement coupled to the communication controller and the squib for transferring a deployment energy to the squib in response to the deployment command signal. The squib is configured to require a predeterminable minimum quantum of energy to effect the firing thereof in response to the deployment command signal. A heater is coupled to an energy transfer arrangement for receiving a second electrical energy from the energy transfer arrangement and providing preheat to the squib in response to the second electrical energy, whereby the predeterminable minimum quantum of energy applied to effect firing of the squib is exceeded by a combination of the first electrical energy and the preheat energy, which is monitored and controlled.

25 Claims, 1 Drawing Sheet

AIRBAG SQUIB WITH SILICON CIRCUIT AND ENERGY STORAGE

RELATIONSHIP TO OTHER APPLICATION

This application is related to a copending application entitled Airbag Squib With Temperature Bias, that was filed on the same date as the present application, Feb. 9, 1996 and having U.S. Ser. No. 08/599,611, assigned to the same assignee as herein. The disclosure of the copending application is incorporated herein by reference.

BACKGROUND OF THE INVENTION

1. Field of the Invention

This invention relates generally to supplemental restraint systems for vehicles, and more particularly, to an arrangement for controlling the operation of a deployable supplemental restraint airbag system.

2. Description of the Related Art

Supplemental restraint systems of the type typically used in vehicles deploy an inflatable airbag that is coupled to a gas generating device. When a fault condition of the type requiring deployment of an inflatable airbag is present, an electronic control unit, in response to a fault condition signal, causes a predeterminable quantum of electrical energy to be delivered to an ignitable airbag squib. The squib, which is in communication with the gas generator, causes the generator to inflate the airbag by releasing rapidly an inert, non-toxic gas, such as nitrogen. The rate of release of the gas is sufficient to inflate the airbag generally within milliseconds of the onset of the fault condition.

Typically, a fault condition will result from a collision by the vehicle. A sensor, which may take the form of a normally-open switch, operates in response to an inertial mass to complete an electrical circuit that causes the electronic control unit to issue a relatively large current to the squib. Ultimately, this causes the gas generator to be activated, or ignited, resulting in the rapid release of the inert gas.

In conventional airbag systems, the electronic control unit contains almost all of the circuitry, including an energy storage device that stores the energy which ultimately is released to the squib for firing same. The stored energy, therefore, is transferred from the electronic control unit over cables to the squib, which generally is at a location remote from the electronic control unit. The electronic control unit monitors the connection between it and the squib, generally each time the vehicle is started, to ensure the integrity of the system. Thus, the electronic control unit measures accurately all of the parameters that ensure that the system will be operable, when required. Among such items to be checked is the integrity and resistivity of the cables that interconnect the squib to the electronic control unit, and over which the squib ignition energy is delivered.

One disadvantage of the known inflatable airbag control arrangements is that a highly reliable, low resistivity, interconnection must be maintained between the electronic control unit and the squib. Such an interconnection cannot tolerate short-circuiting to ground or the application of a battery potential on either cable. In addition, the cost and complexity of the electronic control unit in the known arrangements is high, since high voltage circuitry for generating the ignition energy for the squib is packaged with the control circuitry.

It is, therefore, an object of this invention to provide an airbag control system for a vehicle wherein long, high integrity, low resistivity cables for conducting squib firing energy between an airbag control unit and an airbag squib are obviated.

It is another object of this invention to provide an airbag control system for a vehicle wherein significant electrical faults are tolerated, particularly a short-circuit to ground potential in the cable wiring between the airbag electronic control unit and the squib.

It is also an object of this invention to provide an airbag control system for a vehicle wherein significant electrical faults are tolerated, particularly the application of a battery potential to the cable wiring between the airbag electronic control unit and the squib.

It is a further object of this invention to provide an airbag control system for a vehicle wherein the economies of component integration are achieved.

It is additionally an object of this invention to provide an airbag control system for a vehicle wherein the need for a high voltage power source at the airbag electronic control unit is obviated.

It is yet a further object of this invention to provide an airbag control system for a vehicle wherein a high level of noise immunity is achieved to prevent inadvertent firing of the squib in response to electrical noise.

It is also another object of this invention to provide an airbag control system for a vehicle wherein problems associated with heat dissipation are reduced.

It is yet an additional object of this invention to provide an airbag control system for a vehicle wherein the size of the airbag electronic control unit can be reduced.

It is still another object of this invention to provide an airbag control system for a vehicle wherein a greater magnitude of electrical resistance can be tolerated in the communication between the airbag electronic control unit and the squib.

It is a yet further object of this invention to provide an airbag control system for a vehicle wherein the need on the part of the airbag electronic control unit to monitor cable resistance between itself and the squib is reduced.

It is also a further object of this invention to provide an airbag control system for a vehicle wherein inadvertent firing of the squib in response to the application of a DC potential is prevented.

SUMMARY OF THE INVENTION

The foregoing and other objects are achieved by this invention which provides, in a first apparatus aspect thereof, a control arrangement for a deployable airbag of a vehicle. The vehicle has at least one fault sensor for providing a fault signal in response to the occurrence of a fault condition that would require the deployment of the deployable airbag. In accordance with the invention, a first airbag controller receives at an input thereof, a first signal which is responsive to the fault signal. This controller produces at an output thereof, in response to the first signal, a deployment command signal that indicates that the deployable airbag is to be deployed. A second airbag controller receives at an input thereof the deployment command signal. This second airbag controller is provided with a communication controller for receiving the deployment command signal. In this first apparatus aspect of the invention, a squib, which is ignitable and which fires in response to the deployment command signal, is also part of the second airbag controller. The airbag is deployed when the squib is fired. In addition, the second airbag controller is provided with an energy transfer arrangement coupled to the communication controller and the squib. The energy transfer arrangement transfers a predetermined deployment energy to the squib in response to the deployment command signal. The communication coupling element, which may be in the form of a cable, is coupled at a first end thereof to the output of the first airbag controller, and at a second end thereof to the input of the second airbag controller. The communication coupler thereby forms a propagation path for the deployment command signal.

In one embodiment of this first apparatus aspect of the invention, the squib is configured to require a predeterminable minimum quantum of energy applied thereto to effect firing thereof in response to the deployment command signal. The second airbag controller is further provided with an electrical energy transfer means coupled to the energy transfer arrangement for delivering a first electrical energy to the squib in response to the deployment signal. Additionally, the second airbag controller is provided with a heater coupled to the energy transfer arrangement for receiving a second electrical energy from the energy transfer element and providing a preheat energy to the squib in response to the second electrical energy. In this manner, the predeterminable minimum quantum of energy applied to effect firing of the squib is exceeded by a combination of the first electrical energy and the preheat energy. In addition to the foregoing, the second airbag controller is provided, in this embodiment of the invention, with a heat monitoring element that provides an electrical characteristic that is varied in response to temperature, and consequently varies in response to changes in the magnitude of a radiated preheat energy.

In a further embodiment of the invention, there is additionally provided in the second airbag controller an energy storage element for storing at least a portion of the predetermined deployment energy. This energy is released to the squib in response to a deployment command signal. The electrical energy that is stored in the energy storage element is received via a port, or a receiving terminal, for receiving a supply energy. At least a portion of the supply energy is distributed to the second airbag controller via the communication coupling arrangement.

In a still further embodiment of the invention, the supply energy is received by the communication controller in a second airbag controller, and is additionally provided to a first energy distribution arrangement coupled to the communication control arrangement for distributing a first portion of the supply energy to the energy storage element. Additionally, there is provided a second energy distribution arrangement coupled to the communication control arrangement for distributing a second portion of the supply energy to the heating element. A transformer means, in this embodiment, is electrically interposed between the communication control arrangement and the energy storage element for converting the first portion of the supply energy to a form whereby the amount of energy stored in the energy storage element is increased. The transformer means, in some embodiments of the invention, is a voltage transformer that increases the voltage of the first portion of the supply energy prior to storage thereof in the energy storage element.

In accordance with a further apparatus aspect of the invention, a control arrangement is provided for controlling the deployment of the deployable airbag of a vehicle, the vehicle having at least one fault sensor for providing a fault signal in response to the occurrence of a fault condition that would require the deployment of a deployable airbag. In accordance with this further aspect of the invention, an airbag controller is formed on a silicon substrate. There is additionally formed on the silicon substrate an airbag controller input for receiving a fault signal, a communication controller coupled at an input thereof to the airbag controller input for receiving the fault signal, a squib which is coupled to the communication controller for firing in response to the fault signal, whereby the deployable airbag is deployed, and an energy transfer arrangement coupled to the communication controller and the squib for transferring a predetermined deployment energy to the squib in response to the deployment command signal.

In one embodiment of this further aspect of the invention, there is additionally provided an energy storage element for storing a first electrical energy. Additionally, the airbag controller is provided with an energy storage coupling arrangement for coupling the energy storage element and the communication control arrangement to the squib. In one highly advantageous embodiment of the invention, the energy storage element is formed on the silicon substrate. An energy transformer is coupled to the communication controller and to the squib for converting a first electrical energy signal from the communications controller to a second electrical energy signal having a higher potential, whereby a greater quantum of energy is stored in the energy storage element. In certain embodiments of the invention, the energy transformer is installed on the silicon substrate.

In a still further embodiment, there is additionally provided a preheating element coupled to the energy transformer for converting a portion of the second electrical energy to a preheat energy source that is propagated to the squib for preheating same. Additionally, there is provided in this embodiment a preheat monitoring arrangement for providing an electrical characteristic responsive to the magnitude of the preheat energy. In a preferred embodiment, the preheating element is formed on the silicon substrate. Additionally, the preheat monitoring element is also formed on the silicon substrate.

In accordance with a method aspect of the invention, a method is provided for controlling an inflatable airbag of a vehicular supplemental restraint system. In accordance with the invention, the method includes the steps of:

first supplying an electrical energy to an airbag controller formed on a silicon substrate, the electrical energy having a first voltage characteristic;

second supplying the electrical energy to a transformer for transforming the voltage characteristic of the electrical energy from the first voltage characteristic to a second voltage characteristic, the second voltage characteristic corresponding, in this embodiment, to a potential greater than that of the first voltage characteristic;

third supplying a first portion of the electrical energy having the second electrical characteristic to an energy storage element, whereby the electrical energy is stored therein;

fourth supplying a second portion of the electrical energy having the second electrical characteristic to a preheating element formed on the silicon substrate, the preheating element causing a preheat energy to be propagated therefrom, the preheat energy having a magnitude responsive to a magnitude of the second portion of the electrical energy having the second electrical characteristics;

monitoring a preheat propagated from the preheating element; and controlling the magnitude of the second portion of the electrical energy having the second electrical characteristic in response to the step of monitoring.

In one embodiment of this method aspect of the invention, the step of monitoring further includes the step of varying an electrical characteristic of a monitor element installed on the semi-conductor substrate. There is additionally provided the further step of supplying the electrical energy stored in the energy storage element to an squib in response to a fault signal. As previously stated, in a preferred embodiment, the squib is formed directly on the silicon substrate.

In accordance with a further method aspect of the invention, there is provided a method of firing an squib for deploying an inflatable airbag of a vehicular supplemental restraint system. The method includes the steps of:

first supplying an electrical energy to a heater element on a semi-conductor substrate whereby the heater element generates heat energy;

applying the heat energy from the heater element to the squib whereby the squib is heated to a heating level below its ignition threshold temperature; and second supplying a further electrical energy to the squib whereby the combination of the heat energy supply to the squib and the further electrical energy exceed the ignition threshold temperature of the squib.

In a specific embodiment of this further method aspect of the invention, there is provided the further step of storing the further electrical energy in a storage element. As previously noted, there additionally is provided the step of transforming the voltage characteristic of the further electrical energy from a first voltage characteristic to a second voltage characteristic, the second voltage characteristic corresponding to a greater potential than the first voltage characteristic.

In this further method aspect, there are provided the further steps of:

monitoring the heat applied from the heater element to the squib; and controlling the electrical energy to the heater element in response to the step of monitoring to ensure that the extent to which the squib is heated remains below the ignition threshold temperature of the squib.

BRIEF DESCRIPTION OF THE DRAWING

Comprehension of the invention is facilitated by reading the following detailed description, in conjunction with the annexed drawing, in which.

DETAILED DESCRIPTION

Figure 1:
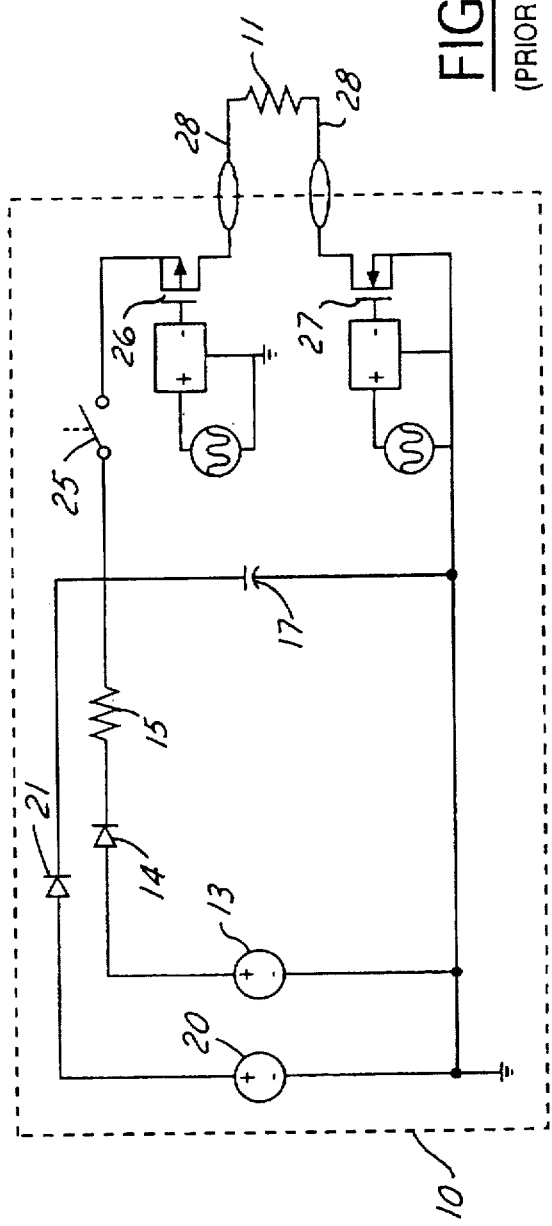
FIG. 1 is a partially schematic and partially function block representation of a prior art electronic airbag controller.

FIG. 1 is a partially schematic and partially function block representation of a prior art arrangement used for controlling the operation of a supplemental restraint inflatable airbag (not shown) for a vehicle (not shown). As shown in the figure, airbag controller 10 contains essentially all of the circuitry for firing a squib 11. In operation, a high voltage power supply 13 supplies energy having a high voltage characteristic via a diode 14 and a resistor 15 to a capacitor 17 that functions as an energy storage element. The high voltage energy is prevented from supplying the vehicle's battery 20 by operation of a blocking diode 21.

When a fault condition is detected, as would be the case in the event of a collision of the vehicle (not shown), a sating sensor 25 is closed and electronic switches 26 and 27 close immediately thereafter. The closure of electronic switches 26 and 27 permits capacitor 17, that has been charged to a relatively high potential by operation of high voltage power supply 13, to discharge through squib 11 via coupling cables 28.

As previously mentioned, it is critical that coupling cables 28 be checked often for conductive integrity and that they maintain low resistivity in order that the current pulse delivered from capacitor 17 not be impeded, thereby ensuring reliable firing of squib 11.

In the centralized airbag control system of FIG. 1, energy has to be transferred from the airbag controller over cables 28 to squib 11. The connection between the squib and the airbag controller must have a low impedance, and the airbag controller must monitor this connection each time the system is operated, such as during the start-up of the vehicle, to guarantee the system integrity.

Figure 2:
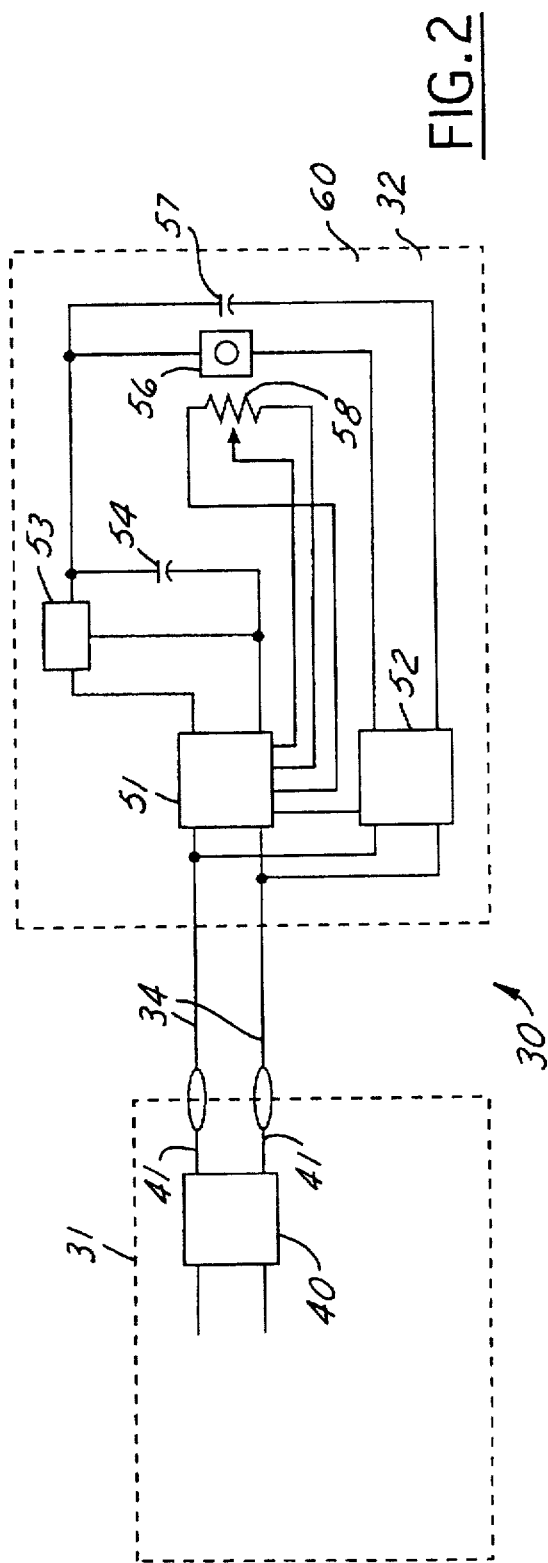
FIG. 2 is a partially schematic and partially function block representation of an airbag control system constructed in accordance with the principles of the invention.

FIG. 2 is a schematic and function block representation of an airbag control arrangement 30 constructed in accordance with the principles of the invention. As shown, the airbag control arrangement 30 is formed generally of an airbag electronic control unit 31 and a second airbag controller 32. Airbag electronic control unit 31 and second airbag controller 32 are coupled to one another via a communication coupling arrangement which, in this specific illustrated embodiment of the invention, is in the form of cables 34. Cables 34 form a propagation path for transmission of a deployment command signal, which will be described hereinbelow.

Airbag electronic control unit 31 contains within it a communication module 40 that issues at its outputs 41 signals that include indications of fault conditions that would require deployment of the airbag (not shown) as will be described herein. Persons of skill in the art can readily determine the conditions of the vehicle that would cause the need for deployment of a supplemental restraint airbag, and the particular modality of the electrical signal that would indicate such a condition. In addition, in this specific illustrative embodiment of the invention, cables 34 are electrically conductive and, in addition to the deployment command signal, also transfer electrical energy to second airbag controller 32. This electrical energy is used, as described below, to enable deployment of the airbag. It is to be understood that, in other embodiments of the invention, the propagation of signals between airbag electronic control unit 31 and second airbag controller 32 need not be via electrically conductive cables, such as cables 34, but may be achieved via other modes of communication that might not require the use of electrically conductive media. In such further embodiments, the electrical energy would be conveyed via separate communications path (not shown). The delivery of such electrical energy to second airbag controller 32 is within the scope of the abilities of a person of ordinary skill in the art.

Second airbag controller 32 receives the communication signals and the electrical energy transferred via cables 34 at a second communication module 51 and an energy control module 52. In this specific illustrative embodiment of the invention, electrical energy is conducted from second communication module 51 to a transformer element 53 that raises the voltage of the electrical energy and thereby increases the quantum of charge that can be stored in capacitor 54, that functions as the energy storage device or means.

Also in this embodiment, the electrical energy that is issued from transformer means or element 53 is conducted through heat radiating device 56 which is shown to be proximal to an ignitable squib 57. In this manner, the heat that is generated by heat radiating device 56 is applied to squib 57 so as to preheat same. The heat is monitored by a heat monitor device 58 that has an electrical characteristic that varies with the heat. Thus, for example, heat monitoring device 58 may be a thermistor having a resistance that varies with temperature, specifically the heat applied thereto. The heat monitoring device is connected to second communication module 51 that issues a corresponding control signal to energy control module 52. The energy control module controls the current through the heat radiating device in response to the variation and electrical characteristic of heat monitoring device 58. In this manner, the heat that is applied to preheat squib 57 is controlled, and it is therefore ensured that squib 57 is not heated beyond its inherent ignition threshold temperature.

At such time as it is determined that a fault condition exists in the vehicle (not shown) which should result in the deployment of the supplement restraint airbag (not shown), the airbag electronic control unit 31 issues an airbag deployment signal via cables 34 to second communication module 51 and energy control module 52. Energy control module 52 closes a circuit that permits the energy stored in capacitor 54 to be conducted through the squib. The magnitude of the current that flows through squib 57 and that would be required to ignite same is reduced by operation of the preheat applied by heat radiating device 56.

In the practice of a method aspect of the invention, electrical energy is supplied to second communication module 51, the electrical energy having a first voltage characteristic. The second communication module delivers electrical energy to transformer element 53 that converts the electrical energy to have a second voltage characteristic which, in this embodiment, corresponds to a greater potential than the first voltage characteristic. This electrical energy having the elevated voltage characteristic is supplied to energy storage element 54 and to heat radiating device 56, as previously described. The heat issued by the heating element is monitored by heat monitoring device 58, and the resulting change in its electrical characteristic is employed to control the magnitude of the current flowing through heat radiating device 56. In a preferred embodiment of the invention, heat radiating device 56, squib 57, and heat monitoring device 58 are formed on a silicon substrate 60. In other embodiments, second communication module 51 and energy control module 52 are also formed on the silicon substrate. In some embodiments of the invention, capacitor 54 can be mounted within the housing (not shown) of the second airbag controller, or it can be placed externally, near a connector (not shown).

The invention, therefore, optimizes the energy required to fire the squib by employing at least two phases. In the first phase, the squib is preheated to a temperature below the ignition temperature. When the system is in an inactive state, the squib is maintained in this elevated temperature condition, but in a "no fire" state. In the second phase, the energy stored in the capacitor is caused to flow through the squib causing its temperature to exceed its characteristic ignition temperature. It is an advantage of the present invention that the resistivity of cables 34 which interconnect airbag electronic control unit 31 and second airbag controller 32 can be up to 1,000 times higher than that of conventional systems, such as that described in FIG. 1.

Squib firing requires a minimum predeterminable quantum of energy which, in the context of the present invention, is effected by a combination of heat applied to the squib firing region, and the firing current delivered from the energy storage element in response to the vehicle fault signal. As previously noted, the squib firing region is heated, illustratively by the application of a current to the heat radiating device. The energy required to effect the squib firing is proportional to the difference in temperature required to achieve the flash point temperature of the squib. That is, the higher the preheating temperature, the lower is the additional energy required to achieve the firing, and consequently, the lower is the magnitude of the required firing current. Of course, the squib firing preheat temperature must be maintained at a safe temperature below the firing threshold. It is to be understood that preheating of the squib can be achieved from other sources of heat that are not necessarily disposed on the silicon substrate.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. A control arrangement for a deployable airbag of a vehicle, the vehicle having at least one fault sensor for providing a fault signal in response to the occurrence of a fault condition which would require the deployment of the deployable airbag, the control arrangement comprising:

an airbag electronic control unit for receiving at an input thereof a first signal responsive to the fault signal, and for producing at an output thereof in response to the first signal a deployment command signal that indicates that the deployable airbag is to be deployed;

airbag controller means for receiving at an input thereof the deployment command signal, said airbag controller means being provided with;

communication control means for receiving the deployment command signal;

squib means for firing in response to the deployment command signal whereby the deployable airbag is deployed; and energy control means coupled to the communication control means and said squib means for transferring a predetermined deployment energy to said squib means in response to the deployment command signal; and communication coupling means coupled at a first end thereof to said output of said airbag electronic control unit, and at a second end thereof to said input of said airbag controller means, for forming a propagation path for the deployment command signal.

2. The control arrangement of claim 1, wherein said squib means requires a predeterminable minimum quantum of energy applied thereto to effect firing thereof in response to the deployment command signal, and there is further provided in said airbag controller means:

energy storage means coupled to said energy control means for delivering a first electrical energy to said squib means in response to the deployment signal;

heating means coupled to said energy control means for receiving a second electrical energy from said energy storage means and providing a preheat energy to said squib means in response to said second electrical energy, whereby the predeterminable minimum quantum of energy required to effect firing of said squib means is exceeded by a combination of said first electrical energy and said preheat energy; and heat monitoring means for providing an electrical characteristic responsive to the magnitude of said preheat energy.

3. The control arrangement of claim 1, wherein there is further provided in said airbag controller means energy storage means for storing at least a portion of the predetermined deployment energy, and releasing the at least a portion of the predetermined deployment energy to said squib means in response to the deployment command signal.

4. The control arrangement of claim 3, wherein there is further provided in said airbag electronic control unit means for receiving a supply energy.

5. The control arrangement of claim 4, wherein at least a portion of the supply energy is distributed to said airbag controller means via said communication coupling means.

6. The control arrangement of claim 5, wherein said at least a portion of the supply energy is received by said communication control means in said airbag controller means, and there is further provided:

heating means for providing preheat energy to said squib;

first energy distribution means coupled to said communication control means for distributing a first portion of said supply energy to said energy storage means; and second energy distribution means coupled to said communication control means for distributing a second portion of said supply energy to said heating means.

7. The control arrangement of claim 6, wherein said first energy distribution means is a transformer means electrically interposed between said communication control means and said energy storage means for converting the first portion of the supply energy to a form whereby the amount of energy stored in said energy storage means is increased.

8. The control arrangement of claim 7, wherein said transformer means comprises a voltage transformer for increasing the voltage of the first portion of the supply energy prior to storage thereof in said energy storage means.

9. The control arrangement of claim 6, wherein said second energy distribution means includes said energy control means electrically interposed between said communication control means and said heating means for distributing the second portion of said supply energy to said heating means.

10. A control arrangement responding to a deployment command signal for controlling deployment of a deployable airbag of a vehicle in response to the occurrence of a fault condition requiring the deployment of the deployable airbag, the control arrangement comprising:

an airbag controller formed on a silicon substrate, said airbag controller further having formed on said silicon substrate:

airbag controller input means for receiving the deployment command signal, communication control means coupled at an input thereof to said airbag controller input means for receiving the deployment command signal;

squib means coupled to said communication control means for firing in response to the deployment command signal whereby the deployable airbag is deployed; and energy control means coupled to said communication control means and said squib means for transferring a predetermined deployment energy to said squib means in response to the deployment command signal.

11. The control arrangement of claim 10, wherein there is further provided:

energy storage means for storing a first electrical energy; and said airbag controller is further provided with energy transformer means coupling said energy storage means to said communication control means and supplying said squib means said predetermined deployment energy.

12. The control arrangement of claim 11, wherein said energy storage means is formed on said silicon substrate.

13. The control arrangement of claim 11, wherein said energy transformer means being coupled to said communication control means and to said squib means, for converting a first electrical energy signal from said communication control means to a second electrical energy signal having a higher potential, whereby a greater quantum of energy is stored in said energy storage means.

14. The control arrangement of claim 13, wherein said energy transformer means is formed on said silicon substrate.

15. The control arrangement of claim 11, wherein there is further provided:

preheating means coupled to said energy transformer means for converting a portion of said first electrical energy signal to preheat energy that is propagated to said squib means for preheating said squib means; and preheat monitoring means for providing an electrical characteristic responsive to the magnitude of said preheat energy.

16. The control arrangement of claim 15, wherein said preheating means is formed on said silicon substrate.

17. The control arrangement of claim 15, wherein said preheat monitoring means is formed on said silicon substrate.

18. A method of controlling an inflatable airbag of a vehicular supplemental restraint system, the method comprising the steps of:

first supplying an electrical energy to an airbag controller formed on a silicon substrate, the electrical energy having a first voltage characteristic;

second supplying the electrical energy to a transformer for transforming the voltage characteristic of the electrical energy from the first voltage characteristic to a second voltage characteristic, the second voltage characteristic corresponding to a greater potential than the first voltage characteristic;

third supplying a first portion of the electrical energy having the second voltage characteristic to an energy storage element, whereby the first portion of the electrical energy is stored therein;

fourth supplying a second portion of the electrical energy having the second voltage characteristic to a preheating element formed on the silicon substrate, the preheating element causing a preheat energy to be propagated therefrom, the preheat energy having a magnitude responsive to a magnitude of the second portion of the electrical energy having the second voltage characteristic;

monitoring a preheat energy propagated from the preheating element; and controlling the magnitude of the second portion of the electrical energy having the second voltage characteristic in response to said step of monitoring.

19. The method of claim 18, wherein said step of monitoring comprises the step of varying an electrical characteristic of a monitor element installed on the silicon substrate.

20. The method of claim 18, wherein there is provided the further step of supplying the first portion of the electrical energy stored in the energy storage element to a squib in response to a fault signal.

21. The method of claim 20, wherein the squib is formed on the silicon substrate.

22. A method of firing a squib for deploying an inflatable airbag of a vehicular supplemental restraint system, the method comprising the steps of:

first supplying an electrical energy to a heater element formed on a silicon substrate whereby the heater element generates heat energy;

applying the heat energy from the heater element to the squib; and second supplying a further electrical energy to the squib, whereby the combination of the heat energy supplied to the squib and the further electrical energy ignites the squib.

23. The method of claim 22, wherein prior to performing said step of second supplying there is provided the further step of storing the further electrical energy in a storage element.

24. The method of claim 23, wherein prior to performing said step of storing there is provided the further step of transforming a voltage characteristic of the further electrical energy from a first voltage characteristic to a second voltage characteristic, the second voltage characteristic corresponding to a greater potential than the first voltage characteristic.

25. The method of claim 22, wherein there are provided the further steps of:

monitoring the heat energy applied from the heater element to the squib; and controlling the electrical energy to the heater element in response to said step of monitoring to ensure that the extent to which the squib is heated remains below the ignition threshold temperature of the squib.

* * * * *